(12) United States Patent
Broman

(10) Patent No.: US 9,996,614 B2
(45) Date of Patent: Jun. 12, 2018

(54) METHOD AND SYSTEM FOR DETERMINING RELEVANT TEXT IN A WEB PAGE

(75) Inventor: Paul Broman, Mableton, GA (US)

(73) Assignee: EXCALIBUR IP, LLC, New York, NY (US)

( * ) Notice: Subject to any disclaimer, the term of this patent is extended or adjusted under 35 U.S.C. 154(b) by 504 days.

(21) Appl. No.: 12/755,884

(22) Filed: Apr. 7, 2010

(65) Prior Publication Data

US 2011/0252041 A1     Oct. 13, 2011

(51) Int. Cl.
*G06F 7/00* (2006.01)
*G06F 17/30* (2006.01)

(52) U.S. Cl.
CPC .. *G06F 17/30864* (2013.01); *G06F 17/30616* (2013.01)

(58) Field of Classification Search
USPC ........................ 707/709, E17.116, E17.114
See application file for complete search history.

(56) References Cited

U.S. PATENT DOCUMENTS

| | | | | |
|---|---|---|---|---|
| 6,366,956 | B1* | 4/2002 | Krishnan | 709/223 |
| 6,567,797 | B1* | 5/2003 | Schuetze et al. | |
| 6,941,321 | B2* | 9/2005 | Schuetze et al. | |
| 7,836,009 | B2 | 11/2010 | Paczkowski et al. | |
| 7,996,462 | B2 | 8/2011 | Degenhardt et al. | |
| 8,005,825 | B1* | 8/2011 | Ghosh | 707/723 |
| 2002/0129014 | A1* | 9/2002 | Kim et al. | 707/5 |
| 2002/0161747 | A1* | 10/2002 | Li | G06F 17/30017 |
| 2004/0003351 | A1 | 1/2004 | Sommerer et al. | |
| 2004/0059708 | A1* | 3/2004 | Dean et al. | 707/1 |
| 2004/0205514 | A1 | 10/2004 | Sommerer et al. | |
| 2004/0243645 | A1* | 12/2004 | Broder et al. | 707/200 |
| 2005/0058362 | A1* | 3/2005 | Kita | G06T 5/005 382/254 |
| 2005/0197992 | A1* | 9/2005 | Kipersztok et al. | 706/50 |
| 2005/0289452 | A1* | 12/2005 | Kashi et al. | 715/512 |
| 2006/0064411 | A1 | 3/2006 | Gross et al. | |

(Continued)

FOREIGN PATENT DOCUMENTS

| | | |
|---|---|---|
| JP | 2006-500700 | 1/2006 |
| JP | 2009-265833 | 12/2009 |

(Continued)

OTHER PUBLICATIONS

Official Action issued in connection with U.S. Appl. No. 12/755,913, dated Oct. 9, 2012.

(Continued)

*Primary Examiner* — Tuan A Pham
*Assistant Examiner* — Muluemebet Gurmu
(74) *Attorney, Agent, or Firm* — James J. DeCarlo; Greenberg Traurig, LLP

(57) ABSTRACT

Disclosed is a method and computing device that receives a web page and locates text elements in the web page, where each text element includes a set of one or more characters or symbols. For each text element found, the computing device assigns a weight value to the each text element. The computing device then stores the text from the each text element in a relevant text storage if the weight value for the each text element is above a threshold weight or similar in layout or content to elements above the threshold weight.

22 Claims, 11 Drawing Sheets

(56) References Cited

U.S. PATENT DOCUMENTS

| | | |
|---|---|---|
| 2006/0149775 A1* | 7/2006 | Egnor .......................... 707/102 |
| 2006/0184348 A1* | 8/2006 | Schattka et al. ............... 703/22 |
| 2006/0224587 A1 | 10/2006 | Zamir et al. |
| 2007/0073593 A1* | 3/2007 | Perry .................... G06Q 30/02 |
| | | 705/26.64 |
| 2008/0010268 A1* | 1/2008 | Liao et al. ....................... 707/5 |
| 2008/0065737 A1 | 3/2008 | Burke et al. |
| 2008/0320021 A1 | 12/2008 | Chan et al. |
| 2009/0228442 A1 | 9/2009 | Adams et al. |
| 2009/0228774 A1 | 9/2009 | Matheny et al. |
| 2010/0107088 A1 | 4/2010 | Hunt et al. |
| 2010/0312771 A1 | 12/2010 | Richardson |
| 2011/0119248 A1 | 5/2011 | Abe et al. |
| 2011/0179020 A1 | 7/2011 | Ozzie et al. |
| 2011/0208732 A1 | 8/2011 | Melton et al. |
| 2011/0252060 A1 | 10/2011 | Broman et al. |
| 2011/0252329 A1 | 10/2011 | Broman |

FOREIGN PATENT DOCUMENTS

| | | |
|---|---|---|
| KR | 10-2008-0108248 | 10/2006 |
| KR | 10-2008-0111822 | 12/2008 |

OTHER PUBLICATIONS

Official Action issued in connection with U.S. Appl. No. 12/755,913, dated Jan. 24, 2012.
Official Action issued in connection with U.S. Appl. No. 12/755,757, dated Oct. 1, 2012.
International Search Report and Written Opinion issued in PCT/US2011/031087 dated Nov. 25, 2011.

* cited by examiner

METHOD AND SYSTEM FOR DETERMINING RELEVANT TEXT IN A WEB PAGE

FIELD

The present disclosure relates to web pages, and more specifically to a method and system for determining relevant text in a web page.

BACKGROUND

Web pages contain a lot of information, and this information is often rendered in various forms. For example, web pages often contain areas of text, sidebars, advertisements, user-generated comments, etc. Sometimes, it is important to determine the relevant text of the web page, or the text associated with the subject matter described by the web page, and separate out the rest of the clutter in the web page, such as the web page advertisements, sidebars, etc. Therefore, there remains a need to determine the relevant text of a web page.

SUMMARY

The determination of relevant text in a web page can facilitate the determination of topic(s) or category(ies) associated with the web page. For example, to determine a category or topic of a particular web page, an algorithm needs to analyze the relevant text of the web page and ignore the rest of the clutter (e.g., advertisements) present in the web page.

In one aspect, a computing device receives a web page and locates text elements in the web page, where each text element includes a set of one or more characters or symbols. For each text element found, the computing device assigns a weight value to the text element. The computing device then stores the text from the text element in a relevant text storage if the weight value for the text element is above a threshold weight.

In one embodiment, the storing of the text of each text element includes, if the weight value for a text element is below the threshold weight, storing the text of the text element when its layout or content has a similarity score above a threshold similarity score, the threshold similarity score associated with a text element having a weight value above the threshold weight.

In one embodiment, for each text element, the computing device determines the size of the text element when rendered. In one embodiment, the assigning of the weight value further includes assigning the weight value based on the size of the text element. The assigning of the weight value can include assigning the weight value based on a position of the text element in the web page.

In one embodiment, the locating of text elements in the web page further comprises using the Document Object Model (DOM) standard created by the World Wide Web Consortium (W3C) and implemented in all major web browsers to locate text nodes and their parent elements. In one embodiment, the text nodes are stored in a text node array and the parent elements are stored in a parent element array. In one embodiment, the storing of the text from the text element to the relevant text storage further includes storing the text from the text elements marked as relevant by weight and one or more text elements adjacent to those text elements which satisfy certain layout conditions.

The assigning of the weight value for each patent element can also include calculating the weight value from:

$$w = a/(1+((n*d)/T))$$

where w=the weight value of a current element, a=area of the current element, n=current index of the current element in the parent element array, d=a "drag" coefficient, and T=total number of elements in the parent element array. The calculating of the threshold weight can include calculating the threshold weight from:

$$w_c = w_{avg} * (T/c)$$

where $w_c$=the threshold weight, $w_{avg}$=average weight value for DOM element in document, T=total number of elements in the parent element array, and c=a weight average coefficient.

In one embodiment, each parent element is marked as potentially relevant if the weight of the parent element is above the threshold weight. In one embodiment, the parent element array is sorted in descending order by weight before comparing the weight of each parent element to the threshold weight.

After the comparison is made, the parent element array can be sorted in ascending order by a first node index value. In one embodiment, the computing device determines one or more of whether the sumtotal of text for all text elements which share each parent element have less than a predetermined number of characters of text, whether a left edge of a previous parent element and the current parent element match, and whether the space between the top of the current parent element and the bottom of the previous parent element is less than a maximum allowed gap. In one embodiment, the storing of the text from the text elements corresponding to the (current) parent element occurs if the current parent element is marked as relevant or the left edge of the previous parent element and the current parent element match and the space between the top of the current parent element and the bottom of the previous parent element is less than a maximum allowed gap and a ratio computed for the current parent element and the previous parent element is similar; or a left edge of a next parent element and the current parent element match and the space between the bottom of the current parent element and the top of the next parent element is less than a maximum allowed gap and a ratio computed for the current parent element and the next parent element is similar.

These and other aspects and embodiments will be apparent to those of ordinary skill in the art by reference to the following detailed description and the accompanying drawings.

BRIEF DESCRIPTION OF THE DRAWINGS

In the drawing figures, which are not to scale, and where like reference numerals indicate like elements throughout the several views.

DESCRIPTION OF EMBODIMENTS

Figure 1:
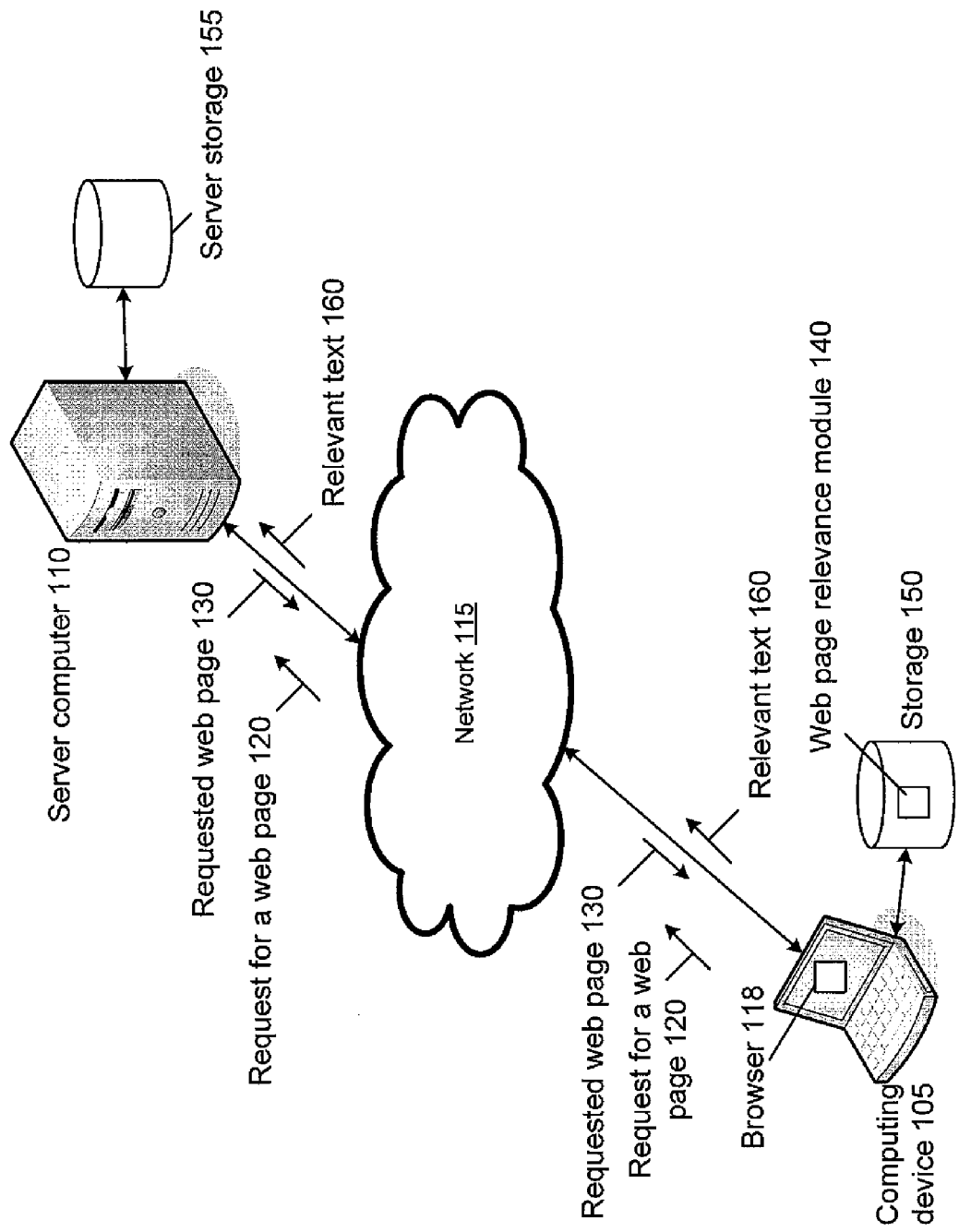
FIG. 1 is a block diagram of a computing device including a web page relevance module and communicating with a server over a network in accordance with an embodiment of the present disclosure.

Embodiments are now discussed in more detail referring to the drawings that accompany the present application. In the accompanying drawings, like and/or corresponding elements are referred to by like reference numbers.

Various embodiments are disclosed herein; however, it is to be understood that the disclosed embodiments are merely illustrative of the disclosure that can be embodied in various forms. In addition, each of the examples given in connection with the various embodiments is intended to be illustrative, and not restrictive. Further, the figures are not necessarily to scale, some features may be exaggerated to show details of particular components (and any size, material and similar details shown in the figures are intended to be illustrative and not restrictive). Therefore, specific structural and functional details disclosed herein are not to be interpreted as limiting, but merely as a representative basis for teaching one skilled in the art to variously employ the disclosed embodiments.

FIG. 1 is a block diagram of an embodiment of a computing device 105 communicating with a server 110 over a network 115 such as the Internet. The computing device 105 (e.g., web browser 118) transmits a request for a web page 120 to the server computer 110. The server computer 110 transmits the requested web page 130 to the web browser 118 of the computing device 105. In one embodiment, the computing device 105 includes a web page relevance module 140 to determine the relevant text of received web pages 130. In one embodiment, the web page relevance module 140 is stored in a storage 150 associated with the computing device 105. The web page relevance module 140 determines the relevant text 160 of the requested web page 130 and transmits the relevant text 160 to the server computer 110. In one embodiment, the server computer 110 stores the relevant text 160 in a server storage 170 associated with the server 110.

In one embodiment, the web page relevance module 140 is a browser plug-in that is downloaded from the server computer 110 to the computing device 105. The web page relevance module 140 can be downloaded as a stand-alone component or as a module embedded within another module. In one embodiment, the server computer 110 transmits the web page relevance module 140 to the computing device 105 after the server computer 110 receives a request for the module 140 from a user of the computing device 105.

For purposes of this disclosure (and as described in more detail below with respect to FIG. 9), a computer or computing device such as the computing device 105 and/or server 110 includes a processor and memory for storing and executing program code, data and software which may also be tangibly stored or read from any type or variety of well known computer readable storage media such as magnetic or optical discs or RAM-discs or tape, by way of non-limiting example. Computers can be provided with operating systems that allow the execution of software applications in order to manipulate data. Personal computers, personal digital assistants (PDAs), wireless devices, cellular telephones, internet appliances, media players, home theater systems, servers, and media centers are several non-limiting examples of computing devices. The computing device 105 and the server 110 can, in one embodiment, also include a display, such as a screen or monitor. As described in more detail below with respect to FIG. 9, storage 150, 170 can include, for example, a memory (e.g., RAM, ROM, etc.), a hard drive, a database, etc.

Figure 2A:
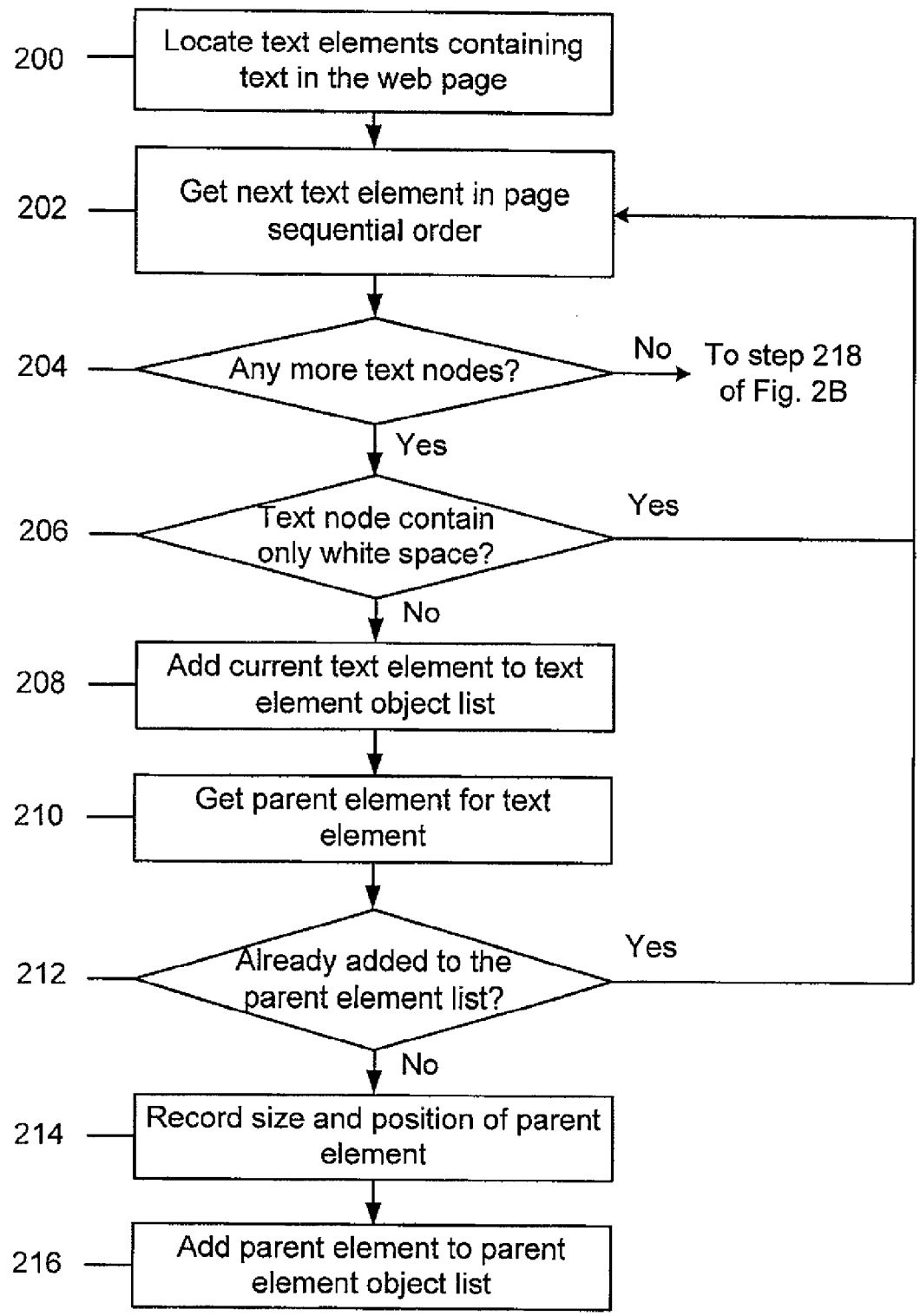
FIGS. 2A, 2B, and 2C are flowcharts illustrating the steps performed by the web page relevance module of FIG. 1 in accordance with an embodiment of the present disclosure.
Figure 2B:
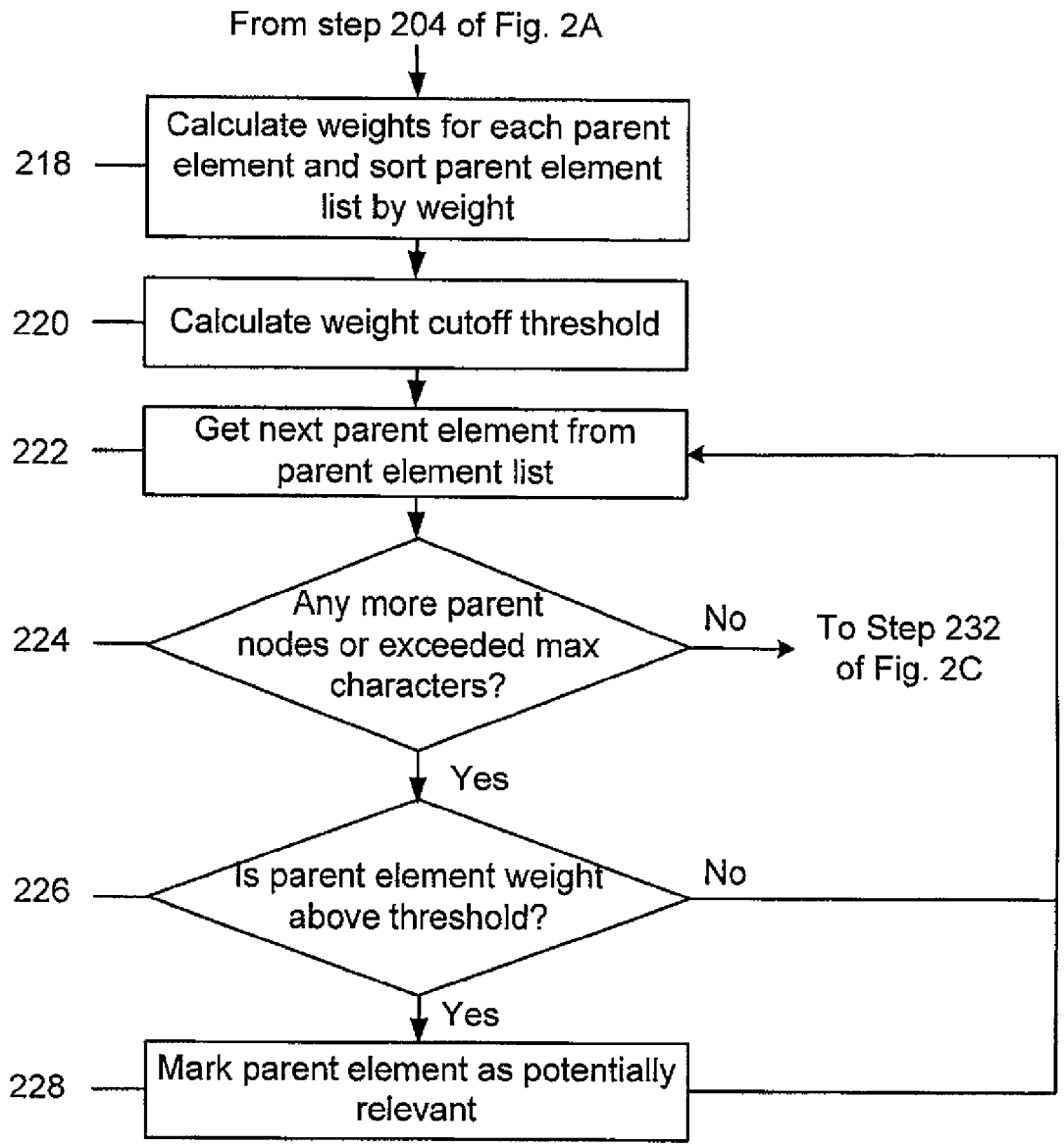
Figure 2C:
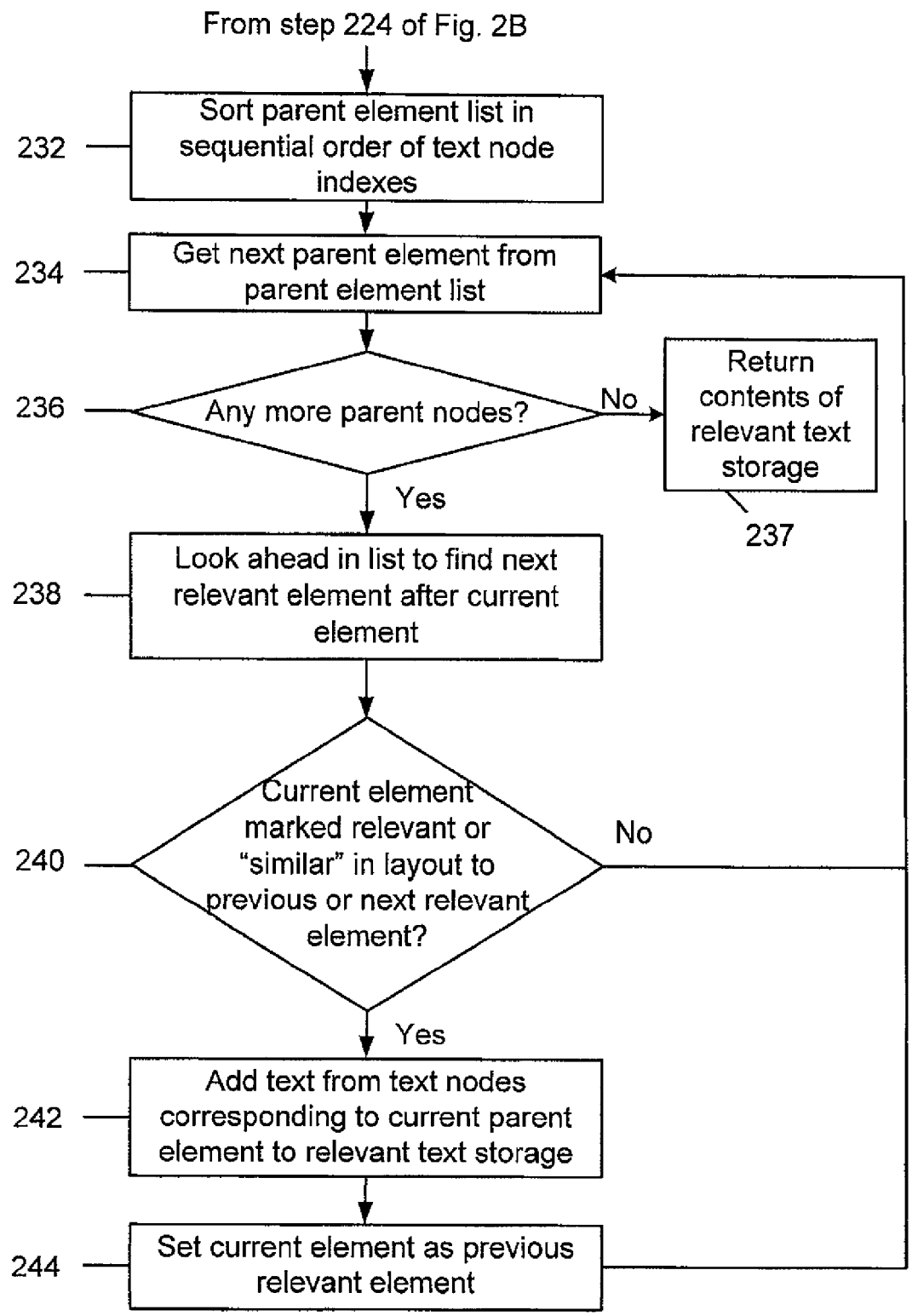

FIGS. 2A, 2B, and 2C are flowcharts illustrating an embodiment of the steps performed by the web page relevance module 140 to determine and extract from a web page 130 the relevant text of the web page 130. The computing device 105 receives a web page 130. The web page relevance module 140 locates text elements containing text in the web page 130 in Step 200. Each text element includes a set of one or more characters or symbols. In one embodiment, the web page relevance module 140 uses the W3C Document Object Model (DOM) standard to locate text elements in the web page 130. For example, in one embodiment the browser 118 uses a layout engine (e.g., Trident developed by Microsoft Corporation of Redmond, Wash.) to parse the HTML of the web page 130 into a DOM tree.

The DOM defines the objects and properties of all document elements, and the methods (interface) to access them. According to the DOM, everything in an HTML document is a node. The DOM states that the entire document is a document node, every HTML element is an element node, the text in the HTML elements are text nodes, every HTML attribute is an attribute node, and comments are comment nodes. Each node is an object. The DOM nodes can be accessed via an object-oriented programming language such as JavaScript.

Figure 3:
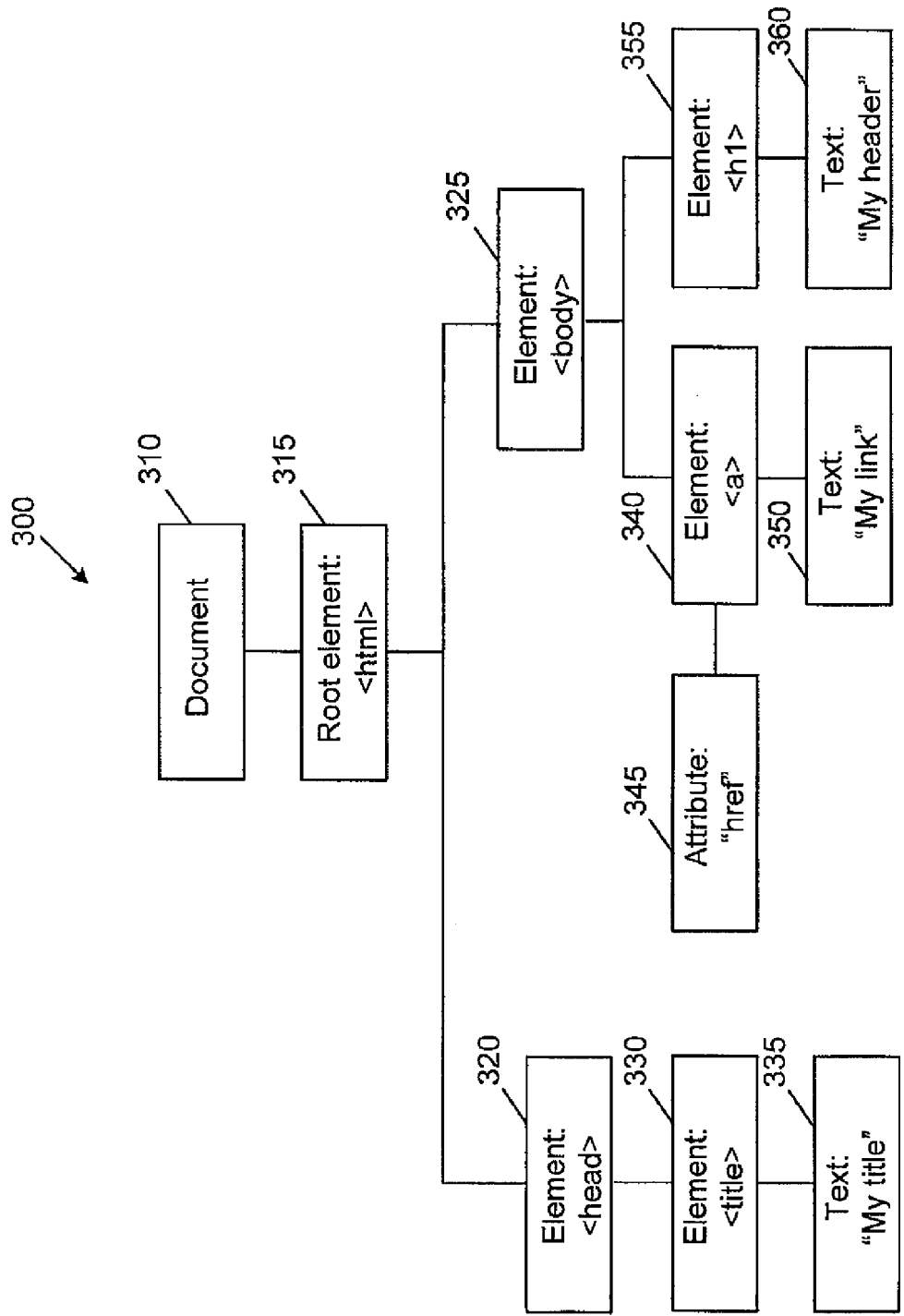
FIG. 3 is an example of a W3C Document Object Model (DOM) node tree associated with a web page in accordance with an embodiment of the present disclosure.

An example of a DOM (node) tree 300 associated with an HTML web page is shown in FIG. 3. The nodes in the node tree have a hierarchical relationship to each other. The terms parent, child, and sibling are typically used to describe the relationships. Parent nodes have children. Children on the same level are called siblings (brothers or sisters). In a node tree, the top node is called the root. Further, every node, except the root, has exactly one parent node. A node can have any number of children. A leaf is a node with no children. Siblings are nodes with the same parent.

In this example, the document object 310 is the parent of a root element <html> 315. The root element 315 is a parent to an Element <head> 320 and an Element <body> 325. The Element <head> 320 is the parent to an Element <title> 330, which is a parent to a Text node "My title" 335. The Element <body> 325 is a parent to an Element <a> 340 which has an attribute 345. The Element <a> 340 is a parent to a Text node "My link" 350. The Element <body> is also a parent to Element <h1> 355, which is a parent to a Text node "My header" 360.

In Step 202, the web page relevance module 140 gets the next text element in page sequential order. The text element is akin to elements 335, 350 and 360. The web page relevance module 140 determines if there are any additional text nodes (step 204). If not, the process continues at step 218 (described below). If so, the web page relevance module 140 determines if the text node contains only white space (step 206). If so, the process returns to step 202. If not, the current text element is added to a text element object list in step 208. The web page relevance module 140 then obtains a parent element for the text element in step 210.

The web page relevance module 140 determines if the parent element has already been added to the parent element list in step 212. If so, the process returns to step 202. If not, the web page relevance module 140 records the size and position of the parent element in step 214. The parent element is added to the parent element object list in step 216.

Referring again to step 204, if there are no more text nodes, the web page relevance module 140 calculates weights for each parent element and sorts the parent element list by weight (step 218 of FIG. 2B). A weight cutoff threshold is calculated (step 220), and a next parent element in step 234. The web page relevance module 140 determines if there are any more parent nodes in step 236. If not, the contents of the relevant text storage are returned in step 237. If so, the web page relevance module 140 looks ahead in the list to find the next relevant element after the current element (step 238). In one embodiment, the relevant text storage is a document or a text string. The web page relevance module 140 determines if the current element is marked relevant or "similar" in layout to the previous or next relevant element in step 240. If not, the process returns to step 234. If so, text from text nodes corresponding to the current parent element are added to the relevant text storage in step 242. The web page relevance module 140 then sets the current element as previous relevant element in step 244, and the process returns to step 234.

An embodiment of pseudocode to walk the DOM tree (FIG. 2A) is shown below:

```
Begin
    Initialize array of DOM element objects
    Initialize array of DOM text node objects
    Initialize node index value to 0
    Get DOM text nodes from current document
    Loop over DOM text nodes (in order of appearance)
        If text node contains any non-whitespace text
            Get parent DOM element for DOM text node
            If parent element type is not ignored*
                Increment node index value
                If parent element already in DOM element object array
                    Append cur text node's text to text in existing element obj
                    Set last node index val to cur node index val in existing obj
                Else
                    If parent element is not hidden in DOM
                        Get layout rect for parent element
                        If rect top is above cutoff threshold
                            Create new DOM element object
                            Initialize text in object to cur text node's text
                            Set layout rect in object to layout rect obtained
                            Set area in object to area computed from layout rect
                            Set first and last node index values in object to current index
                                value
                            Add new DOM element object to DOM element object array
                        End If
                    End If
                End If
                Create new DOM text node object
                Initialize text in object to cur text node's text
                Set node index in object to current node index value
                Add new DOM text node object to DOM text node object array
            End If
        End If
    End Loop
End
```

*In one embodiment, elements of type <SCRIPT>, <META>, <IFRAME>, <STYLE>, <IMG>, <OBJECT>, and other elements which can have no visible text representation are ignored is obtained from the parent element list (step 222). The web page relevance module 140 then determines if there are any more parent nodes or if a maximum characters has been exceeded in step 224. If not, the process continues at step 232 of FIG. 2C (described below). If so, the web page relevance module 140 calculates the parent element weight in step 226 and then determines if the parent element weight is above a threshold (step 226). If not, the process returns to step 222. If so, the parent element is marked as potentially relevant in step 228.

Referring again to step 224, if there are more parent nodes or if the maximum characters has been exceeded, the parent element list is sorted in sequential order of text node indexes (step 232 of FIG. 2C). The web page relevance module 140 then gets the next parent element from the parent element list In one embodiment, two arrays are populated. One array contains the text nodes found in the web page 130. The second array contains visible elements in the web page 130 that are above a specified cutoff threshold (i.e., its position on the web page is above the cutoff threshold). In one embodiment, the specified cutoff threshold is 2000 pixels. In one embodiment, each entry in the element array contains the text found in the element, plus the node index values (into the other text node array) where the first and last text nodes known to be found in that element can be found (and all intervening values are guaranteed to also be in that same element).

An embodiment of pseudocode to find the most relevant DOM elements (FIG. 2B) is shown below:

```
Begin
    Initialize running element weight sumtotal to 0
    Loop over all the DOM element objects in the DOM element object
    array
        If this DOM element is less than 200 pixels wide (the element
resembles a sidebar)
            Set its weight value to 0
        Else
            Compute a weight value for the DOM element using this
            formula*:
                w = a / (1 + ((n * d) / T)
            Add the computed weight to the running sumtotal of all
            element weights
        End If
    End Loop
    Sort the DOM element array in descending order by weight
    Calculate the weight cutoff value using this formula*:
    w_c = w_avg * (T / c)
    Initialize the number of characters found to 0
    Loop over all the DOM element objects in the DOM element array
    (now sorted by weight)
        If the weight of the current DOM element > weight cutoff
            Mark the DOM element as potentially containing text to use
            Increment the number of characters found by the number of
            chars in the DOM element
            If the number of chars exceeds the maximum number of
            chars (e.g., 3000 characters) to return
                Break out of the loop
            End If
        Else
            Break out of the loop
        End If
    End Loop
End
```

*where:
w = weight of current element
$w_c$ = weight cutoff minimum value
$w_{avg}$ = average weight value for DOM element in document
a = area of element (in pixels)
c = 'weight average coefficient', a number derived from tweaking of the algorithm (in one embodiment, this value is set to 40)
n = current index of element in element array
d = the 'drag coefficient', a number derived from tweaking of the algorithm (in one embodiment, this value is set to 30)
T = the total number of elements in the element array In one embodiment, the weight formula has the effect of giving a higher weight to elements with a larger size on the web page 130. In one embodiment, the benefit of giving the higher weight to elements with a larger size declines as the element is positioned further down in the document. In one embodiment, the weight cutoff formula $$w_c = w_{avg} * (T/c)$$

has the effect of giving the highest weight value to elements positioned higher in the web page (allowing the size of the document to have an effect on how stringent this restriction is). In one embodiment, when this pseudocode is executed, the DOM element array has some elements marked as being the elements which are most likely to be relevant for purpose of text extraction.

An embodiment of extracting text from the most relevant elements (FIG. 2C) is shown below:

```
Begin
    Sort the DOM element array in ascending order by first node index value
    Initialize the text string to return to empty string
    Initialize the previous DOM element object to null
    Loop over all the DOM element objects (now sorted in order they appear)
        If there is no previous DOM element object OR
            the text string to return has less than 500 chars of text OR
            the left edge of this previous and current DOM elements match OR
            the gap between the top of the current element and the bottom of the previous
            element is less than the maximum allowed gap THEN
            Find the next element (beyond the current position in the DOM element object
            array) that is marked as relevant
            Compute the 'ratio' of area to text for the current element
            Compute the 'ratio' of area to text for the previous element (if any)
            Compute the 'ratio' of area to text for the next element (if any)
            If the current DOM element is marked as relevant OR
                (The previous DOM element's left edge is the same as the current
                element's AND the gap between the top of the current element and the
                bottom of the previous element is less than a proscribed maximum* AND
                the 'ratio' computed for the current and previous element is similar*) OR
                (The next DOM element's left edge is the same as the current element's
                AND the gap between the bottom of the current element and the top of the
                next element is less than a proscribed maximum* AND the 'ratio'
                computed for the current and next element is similar*) THEN
                Loop over all the elements in the DOM text node array
                    If the index of the current DOM text node object is between the
                    first and last index values in the current DOM element object
                    THEN
                        Add the text from the current DOM text node to the text string
                        to return
                    End If
                End Loop
                Set the previous DOM element to be the current DOM element
                If the number of chars in the text string to return exceeds the
                maximum number of chars to return
                    Break out of the loop
                End If
            End If
        End If
```

End Loop
    Return the text string containing the relevant text from the HTML document
End

*An embodiment of the current value of these constants is:
the proscribed maximum gap between contigious elements to use is, in one embodiment, 20 pixels.
In one embodiment, the ratios are considered similar if dividing the larger ratio by the smaller ratio yields a value < 2

When the web page relevance module 140 executes the pseudocode above, the relevant text from the HTML document is obtained by scanning the DOM element objects, in order. The algorithm looks for:

1) elements marked as relevant by the pseudocode, or
2) elements adjacent to those elements marked as relevant if certain criteria (about left edges, gaps, and text-to-area ratios) are satisfied.

When such elements are found, the text nodes which are within the index limits of the element object are found and their text is added to the relevant text string. This process continues until all elements are examined, the maximum allowed number of characters are obtained, or a large gap is found between the current relevant element and the next relevant element (typically indicating a potential large gap between an article and its comment section).

In one embodiment, the text of each text element is stored in the relevant text storage if the weight value for a text element is below the threshold weight when its layout or content has a similarity score above a threshold similarity score, the threshold similarity score associated with a text element having a weight value above the threshold weight. For example, if a first text element has content or its layout is similar to a second text element that is above the threshold weight, the first text element can be stored in the relevant text storage because of this similarity. In one embodiment, the similarity score is based on a comparison between the content and/or layout of the two text elements.

Figure 4:
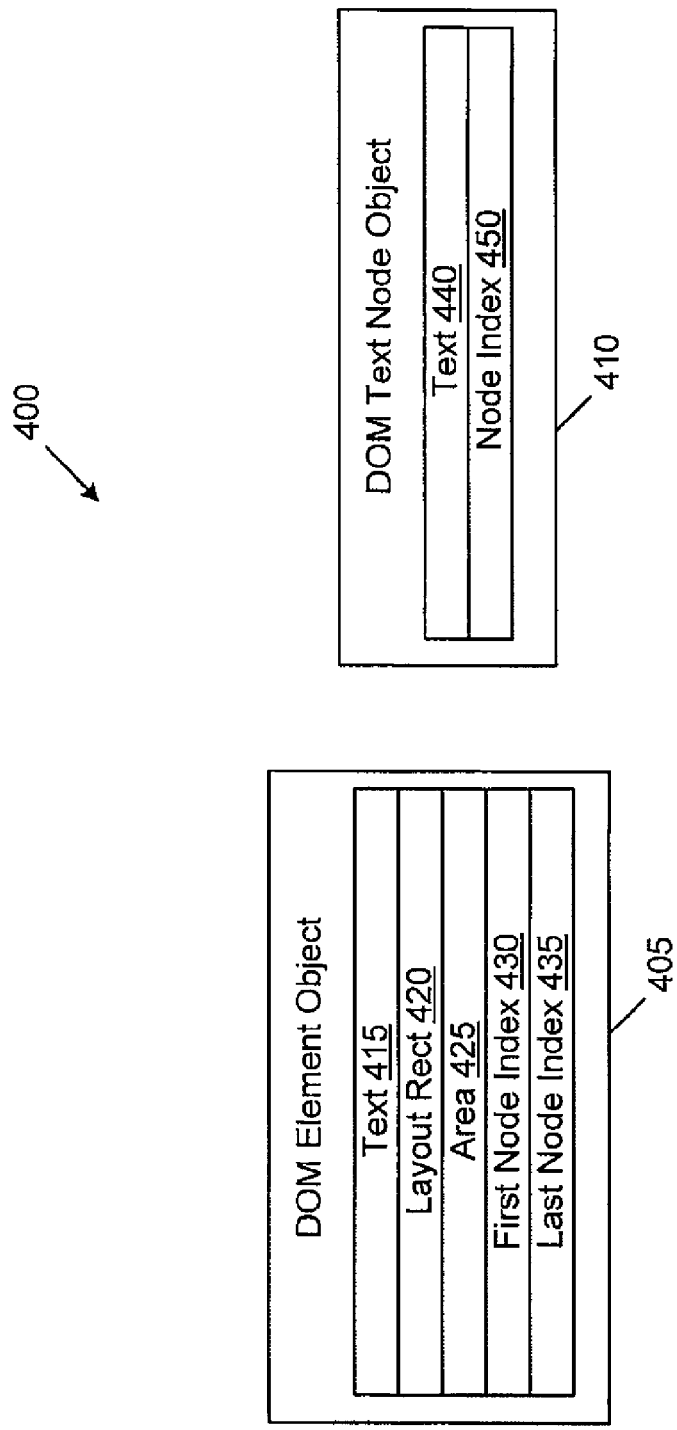
FIG. 4 is a block diagram of object schema used by the web page relevance module in accordance with an embodiment of the present disclosure.

FIG. 4 is a block diagram of an embodiment of object schema 400 used by the web page relevance module 140 in the above algorithms. This schema can be implemented in any object-oriented language, such as C++, JavaScript, etc. The object schema 400 includes a DOM element object 405 and a DOM text node object 410. The DOM element object 405 includes a text record 415, a layout rectangle record 420, an area record 425, a first node index record 430, and a last node index record 435. The text record 415 stores text that is in the web page 130. The layout rectangle record 420 stores coordinates of rectangles having the text in the text record 415. The area record 425 is the area, in pixels, of the layout rectangle encapsulating the text in text record 415. The first node index record 430 is an index of the first text node corresponding to this parent element found in the web page 130. The last node index record 435 is an index of the last text node corresponding to this parent element found in the web page 130.

The DOM text node object 410 includes two records: a text record 440 and a node index record 450. The text record 440 is the text found in a text node of a web page 130. The node index 450 is an index of the text node found in the web page 130. This index corresponds to the indexes held in the element object, and is thus used to link the text node objects to the parent element objects. Although the objects 405, 410 are described as having records, any data structure can be used, such as arrays, lists, etc.

Figure 5:
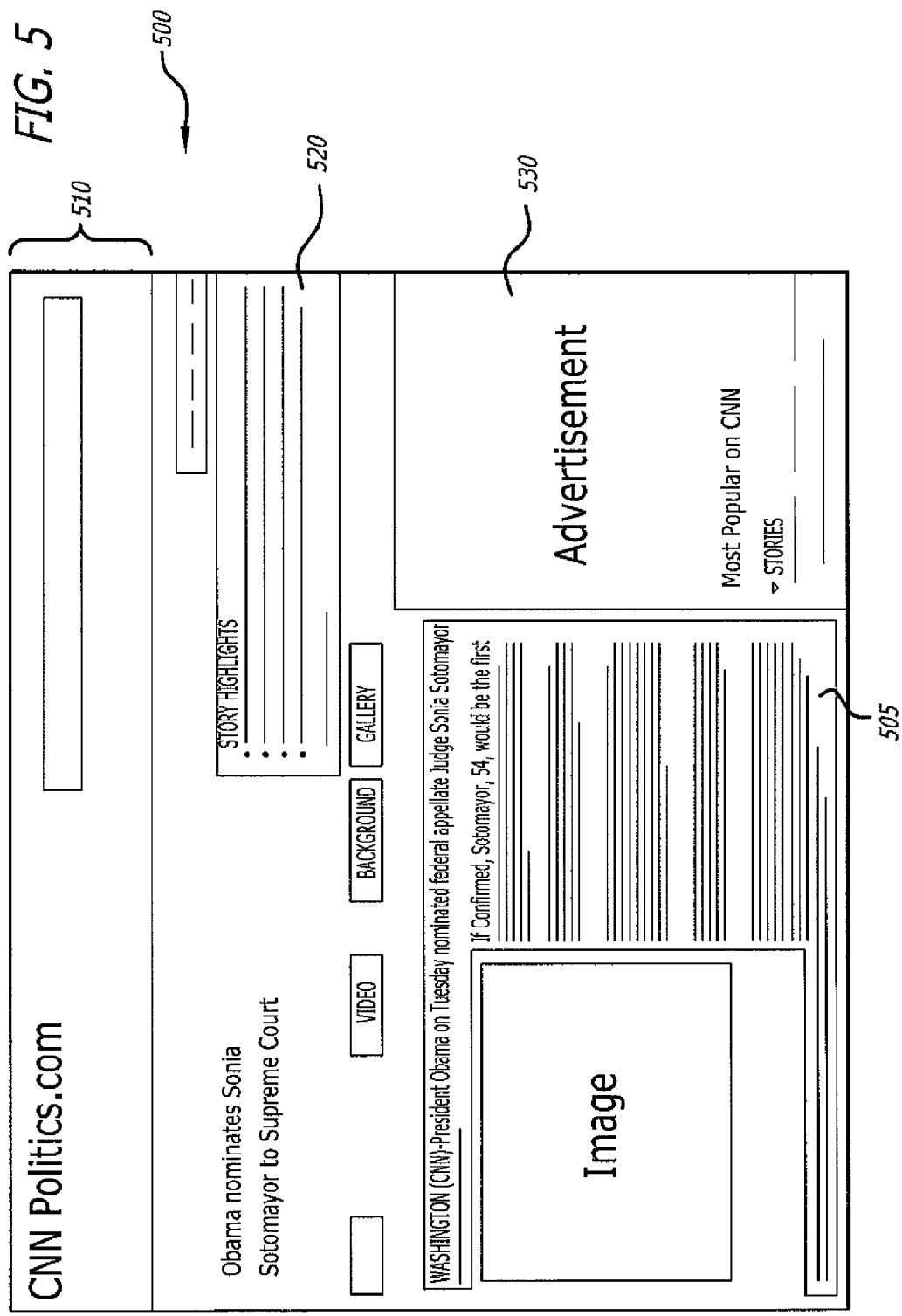
FIG. 5 is a first screen shot of a web page that is analyzed by the web page relevance module in accordance with an embodiment of the present disclosure.

FIG. 5 is an embodiment of a screen shot of a web page 500 having text and extraneous clutter. Web page 500 includes particular text in text block 505. Web page 500 also includes extraneous clutter, such as blocks 510, 520, and advertisement 530.

Execution of the above algorithm described in FIG. 2 and the associated pseudocode with respect to FIG. 5 is shown below.

Obama nominates Sonia Sotomayor to Supreme Court
    President Obama on Tuesday nominated federal appellate Judge Sonia Sotomayor to the U.S. Supreme Court.
    If confirmed, Sotomayor, 54, would be the first Hispanic U.S. Supreme Court justice and the third woman to serve on the high court.
    Sotomayor "is an inspiring woman who I believe will make a great justice," Obama said at a White House announcement.
    She "has worked at almost every level of our judicial system, providing her with a depth of experience and a breadth of perspective that will be invaluable as a Supreme Court justice," he added.
    Obama said Sotomayor would bring more experience on the bench than anyone currently serving on the Supreme Court when appointed.
    "Thank you, Mr. President, for the most humbling honor of my life," Sotomayor said.
    However, Sotomayor has endured recent criticism in the media and blogs from both the left and right over perceived—some defenders say invented—concerns about her temperament and intellect.
    "Judge Sotomayor is a liberal judicial activist of the first order who thinks her own personal political agenda is more important that the law as written," said Wendy Long, counsel to the conservative Judicial Confirmation Network. "She thinks that judges should dictate policy, and that one's sex, race, and ethnicity ought to affect the decisions one renders from the bench."
    As she has risen through the judicial ranks, Sotomayor increasingly has drawn the ire and opposition of conservatives. A majority of Republican senators opposed her elevation to the appellate court in 1998.
    Conservatives point to, among other things, her authoring of a 2008 opinion supporting a decision by the city of New Haven, Conn., to throw out the results of a firefighter promotion exam because almost no minorities qualified for promotions.
    The Supreme Court heard an appeal of the case in April; a final opinion is pending.
    Her critics also highlight comments she made during a panel discussion at Duke University in 2005, where she told students that the federal Court of Appeals is where "policy is made."
    "I know that this is on tape," she then immediately said. "I should never say that. Because we don't 'make law' . . . . I'm not promoting it, and I'm not advocating it. Having said that, the Court of Appeals is where . . . the law is percolating."

However, an official with the Republican National Committee promised that the GOP will be equitable toward Sotomayor.

"The Republicans are going to strike a tone that's fair, that allows the vetting process to happen like it should, and that's in stark contrast to how the Democrats dealt with Judge [John] Roberts when you look back a couple years ago," the official said.

Senate Republicans "will thoroughly examine [Sotomayor's] record to ensure she understands that the role of a jurist in our democracy is to apply the law even-handedly, despite their own feelings or personal or political preferences," said Senate Minority Leader Mitch McConnell, R-Kentucky.

Figure 6:
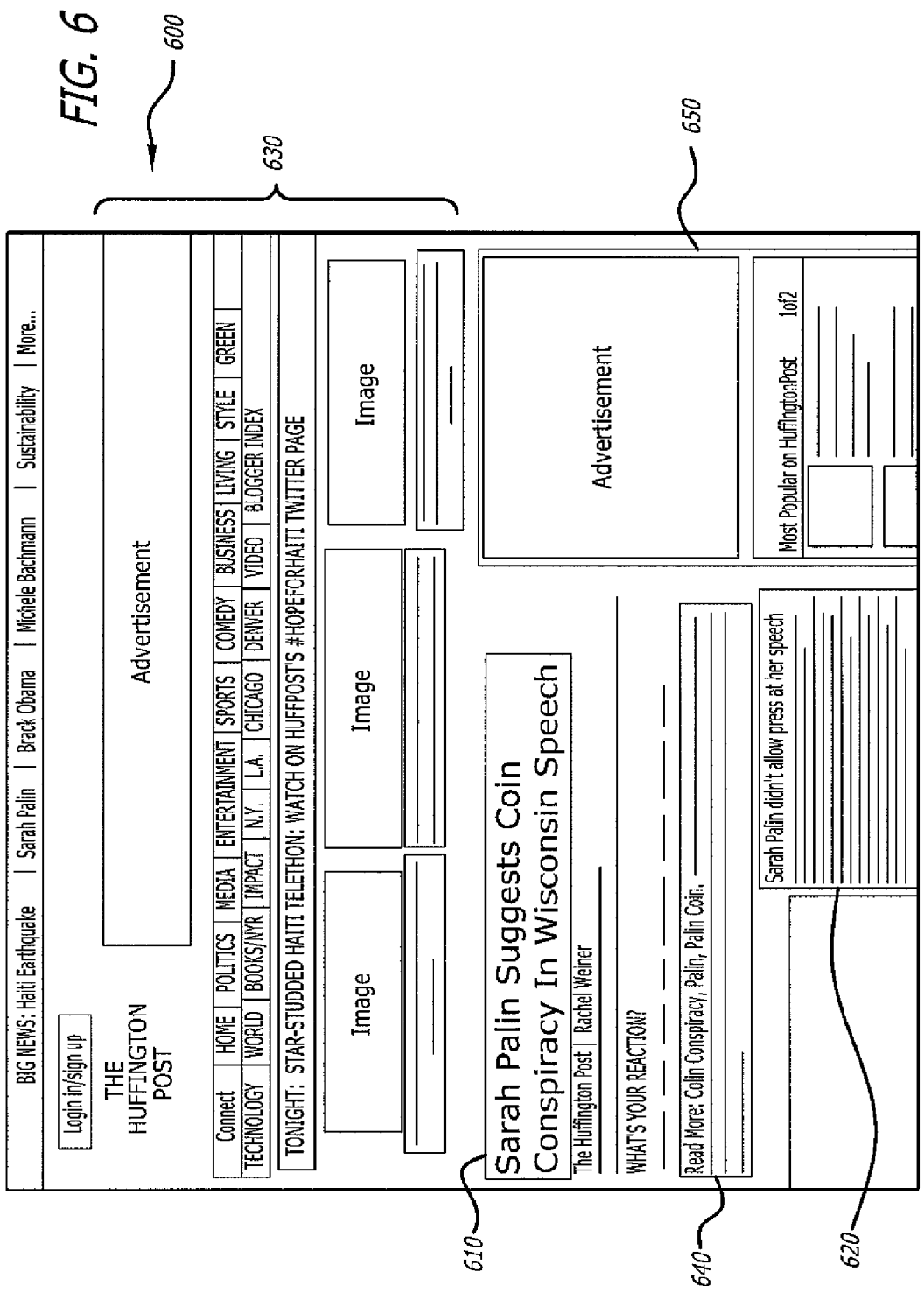
FIG. 6 is a second screen shot of a web page that is analyzed by the web page relevance module in accordance with an embodiment of the present disclosure.

FIG. 6 shows another embodiment of a screen shot 600 having text and extraneous clutter. In particular, web page 600 includes text 610 and text 620. Web page 600 also includes clutter such as, for example, block 630, block 640 and advertisement 650.

Here is an example of the yield from an implementation of this algorithm for the Huffington Post example (from FIG. 6):

Sarah Palin Suggests Coin Conspiracy In Wisconsin Speech|Rachel Weiner

Sarah Palin didn't allow press at her speech Friday at a Wisconsin Right to Life fundraising banquet, and attendees were barred from bringing cell phones, cameras, laptops, or recording devices of any kind. But Politico managed to get a few reporters in to hear the former Alaska governor again raise the specter of death panels and claim an anti-Christian conspiracy in the redesign of U.S. coins.

While Palin didn't use the phrase "death panels," she implied that rationed care would lead to elderly or disabled people being denied care to save money.

"What may they feel about an elderly person who doesn't have a whole lot of productive years left," Palin asked the audience of about 5,000. (Tickets were $30 each.) "In order to save government money, government health care has to be rationed . . . [so] then this elderly person that perhaps could be seen as costing taxpayers to pay for a non-productive life? Do you think our elderly will be first in line for limited health care?"

Palin made the "death panel" charge explicitly in a Facebook post the following day. "We had been told there were no "death panels" in the bill either," she wrote. "But look closely at the provision mandating bureaucratic panels that will be calling the shots regarding who will receive government health care."

expressed fear over the moving of "In God We Trust" to the edge of American coins "Who calls a shot like that?" she demanded. "Who makes a decision like that?"

HuffPost Editor Roy Sekoff appeared on The Joy Behar Show Wednesday night to talk about religion in politics and the controversy surrounding Sarah Palin's "In . . .

Figure 7:
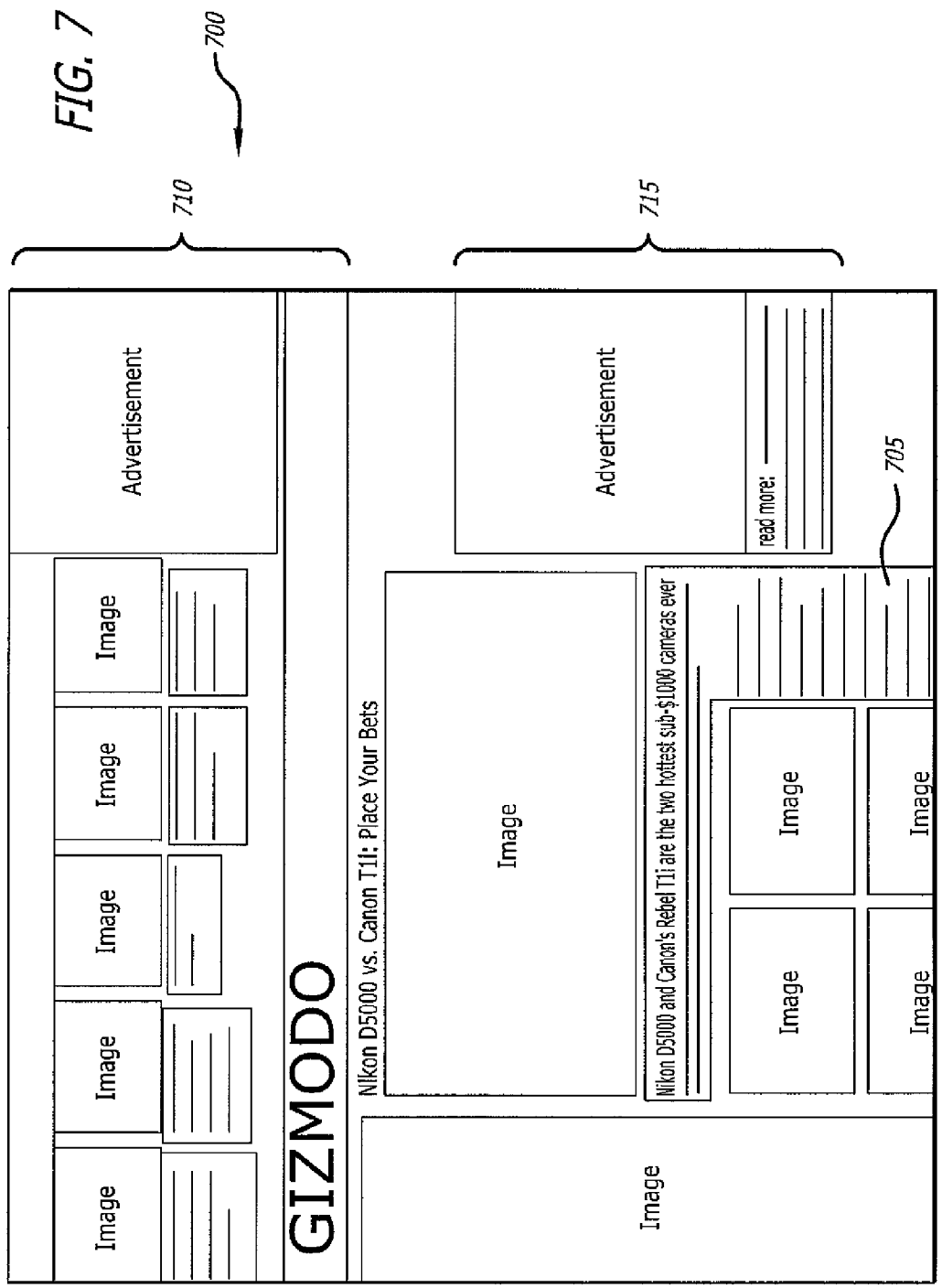
FIG. 7 is a third screen shot of a web page that is analyzed by the web page relevance module in accordance with an embodiment of the present disclosure.
Figure 8:
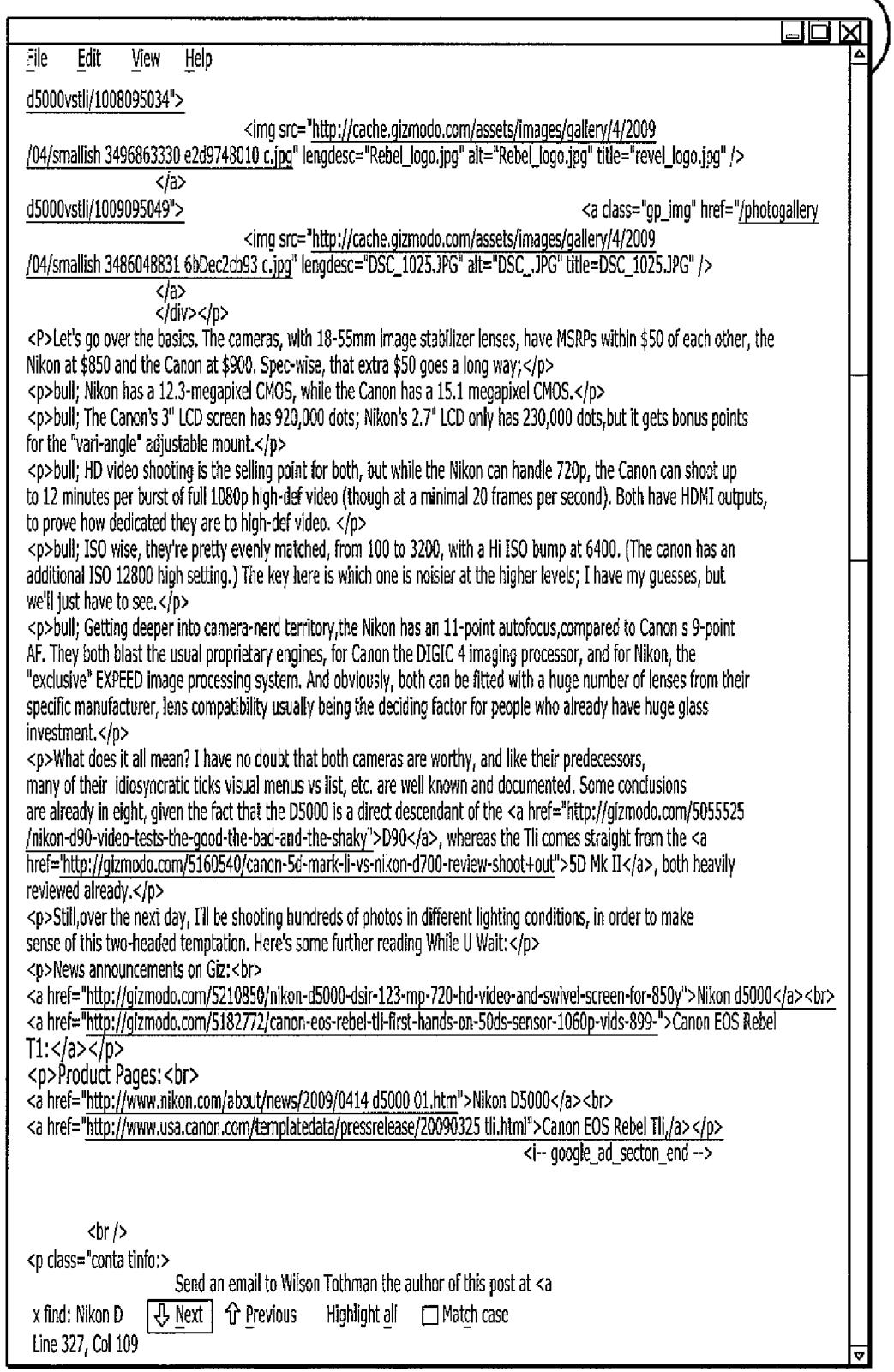
FIG. 8 is HTML markup associated with the third screen shot of FIG. 7 in accordance with an embodiment of the present disclosure.

FIG. 7 illustrates an embodiment of another screen shot having text and clutter. For example, web page 700 has relevant text 705, and clutter 710 and 715. FIG. 8 shows a partial HTML markup 800 for the web page 700 of FIG. 7. The HTML markup 800 illustrates the difficulty a computer algorithm can face attempting to find relevant content in this HTML clutter.

Here is the yield from an implementation of the above algorithm for the Gizmodo example (from FIG. 7):

Gizmodo, etc.

and Canon's Rebel T1i are the two hottest sub-$1000 cameras ever created. But which one is hotter? The specs and shots below say plenty—but tomorrow we give you the final verdict.

Let's go over the basics. The cameras, with 18-55 mm image stabilizer lenses, have MSRPs within $50 of each other, the Nikon at $850 and the Canon at $900. Spec-wise, that extra $50 goes a long way:

Nikon has a 12.3-megapixel CMOS, while the Canon has a 15.1 megapixel CMOS.

The Canon's 3" LCD screen has 920,000 dots; Nikon's 2.7" LCD only has 230,000 dots, but it gets bonus points for the "vari-angle" adjustable mount.

HD video shooting is the selling point for both, but while the Nikon can handle 720 p, the Canon can shoot up to 12 minutes per burst of full 1080 p high-def video (though at a minimal 20 frames per second). Both have HDMI outputs, to prove how dedicated they are to high-def video.

ISO wise, they're pretty evenly matched, from 100 to 3200, with a Hi ISO bump at 6400. (The Canon has an additional ISO 12800 high setting.) The key here is which one is noisier at the higher levels; I have my guesses, but we'll just have to see.

Getting deeper into camera-nerd territory, the Nikon has an 11-point autofocus, compared to Canon's 9-point AF. They both boast the usual proprietary engines, for Canon the DIGIC 4 imaging processor, and for Nikon, the "exclusive" EXPEED image processing system. And obviously, both can be fitted with a huge number of lenses from their specific manufacturer, lens compatibility usually being the deciding factor for people who already have huge glass investment.

What does it all mean? I have no doubt that both cameras are worthy cameras, and like their predecessors, many of their idiosyncratic ticks—visual menus vs lists, etc.—are well known and documented. Some conclusions are already in sight, given the fact that the D5000 is a direct descendant of the D90, whereas the T1i comes straight from the 5D Mk II's loins, both heavily reviewed already.

Figure 9:
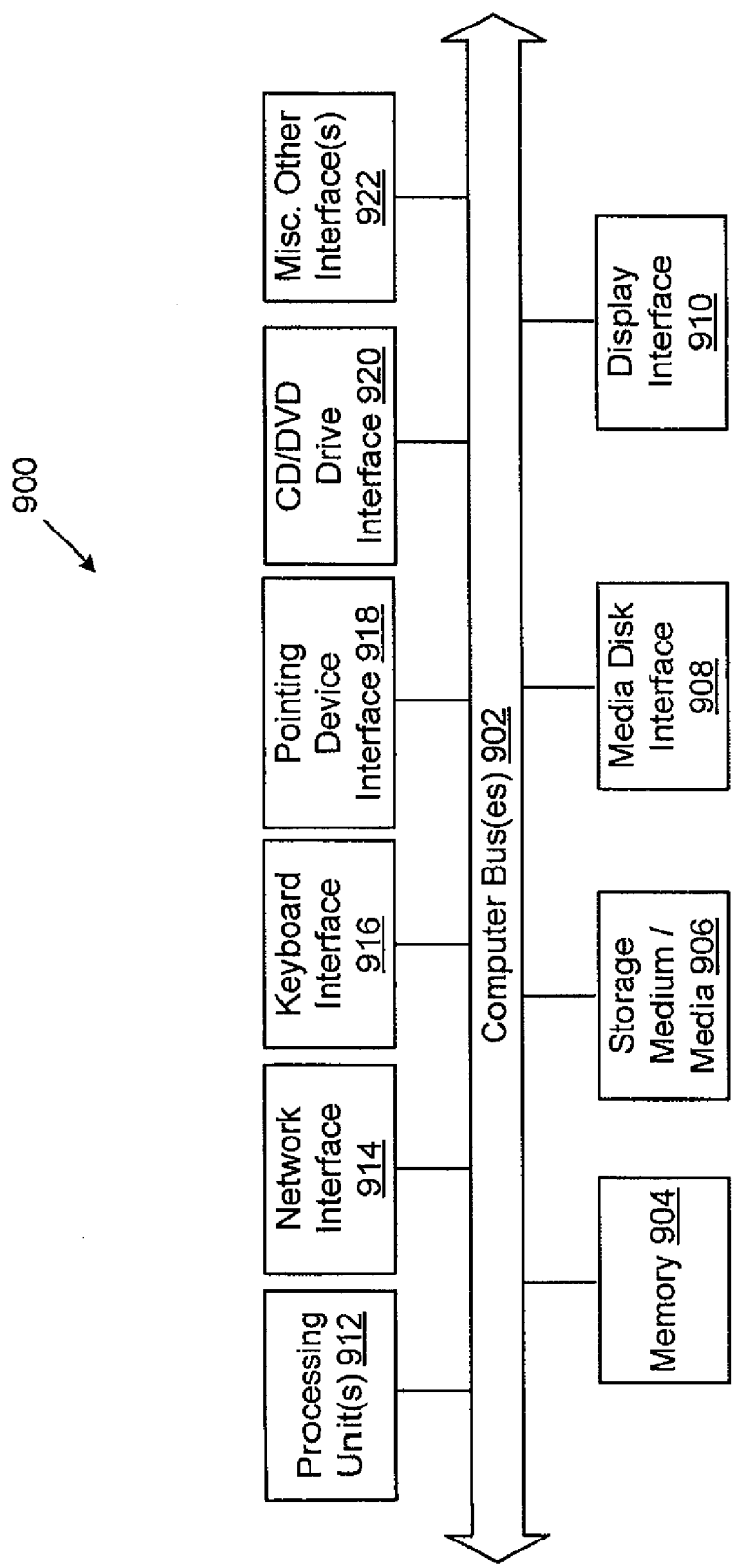
FIG. 9 is an internal architecture of a computing device in accordance with an embodiment of the present disclosure.

Still, over the next day, I'll be shooting hundreds of photos in different lighting conditions, in order to make sense of this two-headed temptation. Here's some further reading While U Wait:

News announcements on Giz:

Product Pages:

FIG. 9 is a block diagram illustrating an internal architecture of an example of a computing device, such as server 110 and/or computing device 105, in accordance with one or more embodiments of the present disclosure. As shown in FIG. 9, internal architecture 900 includes one or more processing units (also referred to herein as CPUs) 912, which interface with at least one computer bus 902. Also interfacing with computer bus 902 are persistent storage medium/media 906, network interface 914, memory 904, e.g., random access memory (RAM), run-time transient memory, read only memory (ROM), etc., media disk drive interface 908 as an interface for a drive that can read and/or write to media including removable media such as floppy, CD-ROM, DVD, etc. media, display interface 910 as interface for a monitor or other display device, keyboard interface 916 as interface for a keyboard, pointing device interface 918 as an interface for a mouse or other pointing device, and miscellaneous other interfaces not shown individually, such as parallel and serial port interfaces, a universal serial bus (USB) interface, and the like.

Memory 904 interfaces with computer bus 902 so as to provide information stored in memory 904 to CPU 912 during execution of software programs such as an operating system, application programs, device drivers, and software modules that comprise program code, and/or computer-executable process steps, incorporating functionality described herein, e.g., one or more of process flows described herein. CPU 912 first loads computer-executable process steps from storage, e.g., memory 904, storage medium/media 906, removable media drive, and/or other storage device. CPU 912 can then execute the stored process steps in order to execute the loaded computer-executable process steps. Stored data, e.g., data stored by a storage device, can be accessed by CPU 912 during the execution of computer-executable process steps.

Persistent storage medium/media 906 is a computer readable storage medium(s) that can be used to store software and data, e.g., an operating system and one or more application programs. Persistent storage medium/media 906 can also be used to store device drivers, such as one or more of a digital camera driver, monitor driver, printer driver, scanner driver, or other device drivers, web pages, content files, playlists and other files. Persistent storage medium/media 906 can further include program modules and data files used to implement one or more embodiments of the present disclosure.

For the purposes of this disclosure, a computer readable medium stores computer data, which data can include computer program code that is executable by a computer, in machine readable form. By way of example, and not limitation, a computer readable medium may comprise computer readable storage media, for tangible or fixed storage of data, or communication media for transient interpretation of code-containing signals. Computer readable storage media, as used herein, refers to physical or tangible storage (as opposed to signals) and includes without limitation volatile and non-volatile, removable and non-removable storage media implemented in any method or technology for the tangible storage of information such as computer-readable instructions, data structures, program modules or other data. Computer readable storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other physical or material medium which can be used to tangibly store the desired information or data or instructions and which can be accessed by a computer or processor.

Those skilled in the art will recognize that the methods and systems of the present disclosure may be implemented in many manners and as such are not to be limited by the foregoing exemplary embodiments and examples. In other words, functional elements being performed by single or multiple components, in various combinations of hardware and software or firmware, and individual functions, may be distributed among software applications at either the client or server or both. In this regard, any number of the features of the different embodiments described herein may be combined into single or multiple embodiments, and alternate embodiments having fewer than, or more than, all of the features described herein are possible. Functionality may also be, in whole or in part, distributed among multiple components, in manners now known or to become known. Thus, myriad software/hardware/firmware combinations are possible in achieving the functions, features, interfaces and preferences described herein. Moreover, the scope of the present disclosure covers conventionally known manners for carrying out the described features and functions and interfaces, as well as those variations and modifications that may be made to the hardware or software or firmware components described herein as would be understood by those skilled in the art now and hereafter.

While the system and method have been described in terms of one or more embodiments, it is to be understood that the disclosure need not be limited to the disclosed embodiments. It is intended to cover various modifications and similar arrangements included within the spirit and scope of the claims, the scope of which should be accorded the broadest interpretation so as to encompass all such modifications and similar structures. The present disclosure includes any and all embodiments of the following claims.

What is claimed is:

1. A method comprising:
   receiving, by a computing device, a web page;
   analyzing, via the computing device, said web page, and based on said analysis, identifying text elements in said web page, said identification comprising determining a position of each text element on said web page, said identification further comprising determining a physical dimension of each text element on said web page, each text element comprising a set of characters or symbols;
   determining, via the computing device, a weight value for each text element, each weight value determination based on a determined position and a determined physical dimension of a respective text element;
   assigning, via the computing device, for each located text element, said determined weight value to a respective text element;
   comparing, via the computing device, for each text element, the assigned weight value to a threshold weight;
   determining, via the computing device, whether said assigned weight satisfies said threshold weight,
      when said assigned weight satisfies said threshold weight, storing, via the computing device, information related to said set of characters or symbols of each text element in storage,
      wherein when said assigned weight does not satisfy the threshold weight:
      analyzing, via the computing device, each text element, and based on said analysis, determining a layout of each text element,
      comparing, via the computing device, each text element's layout to each other, and determining, based on said comparison, a similarity score for each text element, and
      storing, when said text element has an assigned weight below said threshold weight, said information of the text element in said storage when said text element satisfies said similarity score.

2. The method of claim 1 further comprising, for each text element, determining, by the computing device, the size of the each text element when rendered.

3. The method of claim 1 wherein the locating of text elements in the web page further comprises using W3C Document Object Model (DOM) standard to locate text nodes and parent elements.

4. The method of claim 3 further comprising storing, by the computing device, the text nodes in a text node array and storing the parent elements in a parent element array.

5. The method of claim 1 wherein the assigning of the weight value further comprises calculating the weight value from:

$$w = a/(1+((n*d)/T)$$

where w=the weight value of a current text element, a=area of the current text element, n=current index of the current text element in an element array, d=a drag coefficient, and T=total number of text elements in the element array.

6. The method of claim 1 further comprising calculating, by the computing device, the threshold weight from:

$$w_c = w_{avg} * (T/c)$$

where $w_c$=the threshold weight, $w_{avg}$=average weight value for text elements in document, T=total number of elements in an element array, and c=a weight average coefficient.

7. The method of claim 4 further comprising marking, by the computing device, the each text element as potentially relevant if the weight of the each text element is above the threshold weight.

8. The method of claim 7 further comprising sorting, by the computing device, the parent element array in descending order by weight before comparing the weight of the each text element to the threshold weight.

9. The method of claim 7 further comprising sorting, by the computing device, the parent element array in ascending order by a first node index value to find adjacent elements next to the elements marked as relevant by weight.

10. The method of claim 9 wherein finding adjacent elements further comprises determining one or more of
whether the each text element has less than a predetermined number of characters of text,
whether a left edge of a previous text element and the each text element match, and
whether space between the top of the each text element and the bottom of the previous text element is less than a maximum allowed gap.

11. The method of claim 4 further comprising storing, by the computing device, the text from the each text element
if the each text element is marked as relevant or
(a left edge of a previous text element and the each text element match and the space between the top of the each text element and the bottom of the previous text element is less than a maximum allowed gap and a ratio computed for the current text element and the previous text element is similar), or
(a left edge of a next text element and the each text element match and the space between the bottom of the each text element and the top of the next text element is less than a maximum allowed gap and a ratio computed for the current text element and the next text element is similar).

12. A non-transitory computer readable storage medium tangibly storing computer program instructions, that when executed by a computing device, cause the computing device to perform a method comprising:
receiving, by the computing device, a web page;
analyzing, via the computing device, said web page, and based on said analysis, identifying text elements in said web page, said identification comprising determining a position of each text element on said web page, said identification further comprising determining a physical dimension of each text element on said web page, each text element comprising a set of characters or symbols;
determining, via the computing device, a weight value for each text element, each weight value determination based on a determined position and a determined physical dimension of a respective text element;
assigning, via the computing device, for each located text element, said determined weight value to a respective text element;
comparing, via the computing device, for each text element, the assigned weight value to a threshold weight;
determining, via the computing device, whether said assigned weight satisfies said threshold weight,
wherein when said assigned weight satisfies said threshold weight, storing, via the computing device, information related to said set of characters or symbols of each text element in storage,
wherein when said assigned weight does not satisfy the threshold weight:
analyzing, via the computing device, each text element, and based on said analysis, determining a layout of each text element,
comparing, via the computing device, each text element's layout to each other,
and determining, based on said comparison, a similarity score for each text element, and storing, when said text element has an assigned weight below said threshold weight, said information of the text element in said storage when said text element satisfies said similarity score.

13. The non-transitory computer readable storage medium of claim 12 further comprising computer program instructions defining the step of, for each text element, determining the size of the each text element when rendered.

14. The non-transitory computer readable storage medium of claim 12 wherein the computer program instructions defining the step of the assigning of the weight value further comprises computer program instructions defining the step of assigning the weight value based on a position of the each text element in the web page.

15. The non-transitory computer readable storage medium of claim 12 wherein the computer program instructions defining the step of locating of text elements in the web page further comprises computer program instructions defining the step of using W3C Document Object Model (DOM) standard to locate text nodes and parent elements.

16. The non-transitory computer readable storage medium of claim 15 further comprising computer program instructions defining the step of storing the text nodes in a text node array and storing the parent elements in a parent element array.

17. The non-transitory computer readable storage medium of claim 12 wherein the computer program instructions defining the step of assigning the weight value further comprises computer program instructions defining the step of calculating the weight value from:

$$w = a/(1+((n*d)/T)$$

where w=the weight value of a current element, a=area of the current element, n=current index of the current element in an element array, d=a coefficient, and T=total number of elements in the element array.

18. The non-transitory computer readable storage medium of claim 12 wherein the computer program instructions defining the step of storing the text from the each text element in a relevant text storage if the weight value for the each text element is above a threshold weight further comprises calculating the threshold weight from $$w_c = w_{avg} * (T/c)$$

where $w_c$=the threshold weight, $w_{avg}$=average weight value for DOM element in document, T=total number of elements in an element array, and c=a weight average coefficient.

19. The non-transitory computer readable storage medium of claim 18 further comprising computer program instructions defining the step of marking the each text element as potentially relevant if the weight of the each text element is above the threshold weight.

20. The non-transitory computer readable storage medium of claim 19 further comprising computer program instructions defining the step of determining one or more of
    whether the each text element has less than a predetermined number of characters of text,
    whether a left edge of a previous text element and the each text element match, and
    whether space between the top of the each text element and the bottom of the previous text element is less than a maximum allowed gap.

21. The non-transitory computer readable storage medium of claim 16 further comprising computer program instructions defining the step of storing the text from the each text element
    if the each text element is marked as relevant or a left edge of a previous text element and the each text element match and the space between the top of the each text element and the bottom of the previous text element is less than a maximum allowed gap and a ratio computed for the current text element and the previous text element is similar, or
    a left edge of a next text element and the each text element match and the space between the bottom of the each text element and the top of the next text element is less than a maximum allowed gap and a ratio computed for the current text element and the next text element is similar.

22. A computing device comprising:
    a processor; and
    a non-transitory computer-readable storage medium tangibly storing thereon program logic executable by the processor, the program logic comprising:
        logic executed by the processor for receiving, by a computing device, a web page;
        logic executed by the processor for analyzing, via the computing device, said web page, and based on said analysis, identifying text elements in said web page, said identification comprising determining a position of each text element on said web page, said identification further comprising determining a physical dimension of each text element on said web page, each text element comprising a set of characters or symbols;
        logic executed by the processor for determining, via the computing device, a weight value for each text element, each weight value determination based on a determined position and a determined physical dimension of a respective text element;
        logic executed by the processor for assigning, via the computing device, for each located text element, said determined weight value to a respective text element;
        logic executed by the processor for comparing, via the computing device, for each text element, the assigned weight value to a threshold weight;
        logic executed by the processor for determining, via the computing device, whether said assigned weight satisfies said threshold weight,
            when said assigned weight satisfies said threshold weight, storing, via the computing device, information related to said set of characters or symbols of each text element in storage,
            wherein when said assigned weight does not satisfy the threshold weight:
        logic executed by the processor for analyzing, via the computing device, each text element, and based on said analysis, determining a layout of each text element,
        logic executed by the processor for comparing, via the computing device, each text element's layout to each other, and determining, based on said comparison, a similarity score for each text element, and
        logic executed by the processor for storing, when said text element has an assigned weight below said threshold weight, said information of the text element in said storage when said text element satisfies said similarity score.

* * * * *